(12) United States Patent
Dyess et al.

(10) Patent No.: US 11,662,114 B2
(45) Date of Patent: *May 30, 2023

(54) METHODS AND SYSTEMS FOR AUTOMATED HVAC TESTING

(71) Applicant: GridPoint, Inc., Reston, VA (US)

(72) Inventors: Danny Dyess, Roanoke, VA (US); Deepak Budhiraja, Arlington, VA (US); Gerald Zingraf, Arlington, VA (US)

(73) Assignee: GridPoint, Inc., Reston, VA (US)

( * ) Notice: Subject to any disclaimer, the term of this patent is extended or adjusted under 35 U.S.C. 154(b) by 111 days.

This patent is subject to a terminal disclaimer.

(21) Appl. No.: 16/904,173

(22) Filed: Jun. 17, 2020

(65) Prior Publication Data

US 2021/0131686 A1 May 6, 2021

Related U.S. Application Data

(63) Continuation of application No. 15/163,324, filed on May 24, 2016, now Pat. No. 10,724,752.

(51) Int. Cl.
| | |
|---|---|
| *F24F 11/49* | (2018.01) |
| *F24F 11/56* | (2018.01) |
| *F24F 11/64* | (2018.01) |
| *F24F 11/30* | (2018.01) |
| *F24F 11/32* | (2018.01) |
| *F24F 11/62* | (2018.01) |

(Continued)

(52) U.S. Cl.
CPC .............. *F24F 11/49* (2018.01); *F24F 11/30* (2018.01); *F24F 11/32* (2018.01); *F24F 11/38* (2018.01); *F24F 11/46* (2018.01); *F24F 11/56* (2018.01); *F24F 11/62* (2018.01); *F24F 11/64* (2018.01); *G05B 23/0218* (2013.01); *F24F 2140/00* (2018.01); *G01K 2201/00* (2013.01); *G05B 2219/2614* (2013.01); *G05B 2219/31316* (2013.01)

(58) Field of Classification Search
CPC ...... G01K 2201/00; F24F 11/30; F24F 11/46; G05B 23/0218; G05B 2219/31316
See application file for complete search history.

(56) References Cited

U.S. PATENT DOCUMENTS

| | | |
|---|---|---|
| 4,467,616 A | 8/1984 | Kitauchi |
| 4,501,125 A | 2/1985 | Han |
| | (Continued) | |

*Primary Examiner* — Schyler S Sanks
(74) *Attorney, Agent, or Firm* — Bookoff McAndrews, PLLC

(57) ABSTRACT

The invention involves the automated testing of HVAC units using an energy management system. The automated HVAC test is performed to understand if one or more HVAC units are operational across one or more locations. If an HVAC unit is not operational, HVAC testing could be performed to understand which component or stage of the HVAC unit is not working as designed. The automated HVAC test is also used to calculate the efficiency of the HVAC unit(s) being tested. The various HVAC tests are performed on all HVAC units as a form of preventative maintenance and diagnostics. These tests can be scheduled on-demand, for a future date and time, or on a recurring schedule (monthly or quarterly). A report is generated for each HVAC test and can be viewed and exported from a cloud-based energy management platform.

20 Claims, 6 Drawing Sheets

(51) Int. Cl.
*F24F 11/46* (2018.01)
*G05B 23/02* (2006.01)
*F24F 11/38* (2018.01)
*F24F 140/00* (2018.01)

(56) References Cited

U.S. PATENT DOCUMENTS

| | | | |
|---|---|---|---|
| 4,522,336 A | 6/1985 | Culp | |
| 5,801,940 A | 9/1998 | Russ et al. | |
| 5,911,747 A | 6/1999 | Gauthier | |
| 10,571,414 B2 * | 2/2020 | Turner | F24F 11/62 |
| 2003/0102382 A1 * | 6/2003 | Gauthier | F24F 11/62 236/11 |
| 2005/0159846 A1 | 7/2005 | Van Ostrand et al. | |
| 2005/0228607 A1 | 10/2005 | Simons | |
| 2010/0243231 A1 * | 9/2010 | Rosen | G05D 23/1904 236/46 C |
| 2013/0310989 A1 * | 11/2013 | Steinberg | F24F 11/30 700/278 |
| 2015/0345848 A1 | 12/2015 | Him et al. | |
| 2016/0054019 A1 | 2/2016 | Lee et al. | |
| 2016/0098639 A1 | 4/2016 | Choe et al. | |
| 2017/0032476 A1 | 2/2017 | Keil et al. | |

* cited by examiner

TO FIG. 5B →

| UNIT # | UNIT NAME | TEST TYPE | HVAC TYPE | TEST START DATE | OUTDOOR TEMP | IDLE ||| FAN ONLY ||| STAGE 1 |||
|---|---|---|---|---|---|---|---|---|---|---|---|---|---|---|
| | | | | | | LOAD (kW) | ZONE TEMP | SAT | LOAD (kW) | ZONE TEMP | SAT | LOAD (kW) | ZONE TEMP | SAT |
| HVAC1 | HVAC - DINING | HEATING | HEAT PUMP | 3/4/15 11:30 | 80 | 0.0 | 74 | 74 | 3.0 | 73 | 121 | 7.0 | 73 | 121 |
| HVAC2 | HVAC - KITCHEN | HEATING | GAS | 3/4/15 11:30 | 80 | 0.0 | 71 | 71 | 3.0 | 71 | 125 | 6.0 | 71 | 124 |
| HVAC3 | HVAC - OFFICE | HEATING | GAS | 3/4/15 11:30 | 80 | 0.0 | 67 | 67 | 4.0 | 67 | 121 | 4.0 | 67 | 122 |
| HVAC4 | HVAC - LOBBY | HEATING | GAS | 3/4/15 11:30 | 80 | 0.0 | 66 | 66 | 7.0 | 65 | 123 | 7.0 | 65 | 122 |
| HVAC5 | HVAC - UPSTAIRS | HEATING | GAS | 3/4/15 11:30 | 81 | 0.0 | 67 | 67 | 7.0 | 74 | 111 | 7.0 | 74 | 124 |
| HVAC1 | HVAC - DINING | COOLING | HEAT PUMP | 3/4/15 11:30 | 81 | 0.0 | 71 | 71 | 5.0 | 65 | 117 | 7.0 | 65 | 123 |
| HVAC2 | HVAC - KITCHEN | COOLING | AC | 3/4/15 11:30 | 81 | 0.0 | 65 | 65 | 6.0 | 75 | 118 | 6.0 | 75 | 111 |
| HVAC3 | HVAC - OFFICE | COOLING | AC | 3/4/15 11:30 | 81 | 0.0 | 71 | 71 | 5.0 | 65 | 119 | 6.0 | 65 | 123 |
| HVAC4 | HVAC - LOBBY | COOLING | AC | 3/4/15 11:30 | 82 | 0.0 | 72 | 72 | 5.0 | 72 | 114 | 3.0 | 72 | 119 |
| HVAC5 | HVAC - UPSTAIRS | COOLING | AC | 3/4/15 11:30 | 82 | 0.0 | 65 | 65 | 5.0 | 75 | 110 | 6.0 | 75 | 124 |

*FIG. 5A*

| STAGE 1 | | STAGE 2 | | | | | STAGE 3 | | | | | RESULT | ROC1 TOTAL (deg F/min) | ROC2 TOTAL (deg F/watt-min) |
|---|---|---|---|---|---|---|---|---|---|---|---|---|---|---|
| ROC1 (deg F/min) | ROC2 (deg F/watt-min) | LOAD (kW) | ZONE TEMP | SAT | ROC1 (deg F/min) | ROC2 (deg F/watt-min) | LOAD (kW) | ZONE TEMP | SAT | ROC1 (deg F/min) | ROC2 (deg F/watt-min) | | | |
| 2.94 | 0.42 | 6.0 | 68 | 113 | 2.50 | 0.42 | 2.0 | 70 | 114 | 2.88 | 1.44 | PASS | 3.3 | 0.30 |
| 3.31 | 0.55 | 4.0 | 74 | 117 | 2.88 | 0.72 | 5.0 | 70 | 112 | 2.38 | 0.48 | PASS | 2.7 | 0.24 |
| 3.44 | 0.86 | 3.0 | 72 | 113 | 2.88 | 0.96 | 4.0 | 71 | 113 | 2.56 | 0.64 | FAIL REASON | - | - |
| 3.50 | 0.50 | 4.0 | 68 | 115 | 3.13 | 0.78 | 6.0 | 65 | 110 | 2.63 | 0.44 | PASS | 3.1 | 0.28 |
| 3.56 | 0.51 | 5.0 | 72 | 120 | 2.88 | 0.58 | 7.0 | 67 | 113 | 2.56 | 0.37 | PASS | 4.5 | 0.41 |
| 3.25 | 0.46 | 6.0 | 65 | 123 | 3.63 | 0.60 | - | - | - | - | - | PASS | 2.8 | 0.25 |
| 2.88 | 0.48 | 6.0 | 73 | 112 | 2.31 | 0.39 | - | - | - | - | - | PASS | 3.7 | 0.33 |
| 3.25 | 0.54 | 4.0 | 75 | 125 | 3.75 | 0.94 | - | - | - | - | - | FAIL REASON | - | - |
| 2.94 | 0.98 | 7.0 | 74 | 125 | 3.31 | 0.47 | - | - | - | - | - | PASS | 3.8 | 0.34 |
| 3.69 | 0.61 | 4.0 | 65 | 118 | 2.69 | 0.67 | - | - | - | - | - | PASS | 3.1 | 0.28 |

FROM FIG. 5A →

METHODS AND SYSTEMS FOR AUTOMATED HVAC TESTING

FIELD OF THE INVENTION

Aspects of the present disclosure relate generally to methods and systems for automated testing. More specifically, some aspects relate to the automated testing of energy consuming units by an energy management system.

BACKGROUND

An energy management system (or "EMS") may be used to instrument (or "collect data"), monitor, and report on energy consuming devices (e.g., appliances, and equipment include refrigeration units, ovens, toasters, cash registers, sewing machines, compressors, conveyors, kilns, dryers, extruders, LCD displays, lighting panels, HVAC units, sensors, meters, controllers, switches, etc.). An EMS may also be used to generate events and status conditions associated with these devices (e.g., door open, door closed, trash compactor full, trash compactor empty, etc.). The EMS may generate energy usage data, which may be supplemented with other data sources, including environmental and climate data (e.g., temperature, cloud cover, sun rise and set, and relative humidity); non-energy usage data (e.g., water, sewage, and telecommunications); performance data (e.g., uptime, runtime or throughput); and business data (e.g., purchases, orders, packaging, and routing). The EMS may be used to control the devices in response to the data. For example, an HVAC unit may be controlled using real-time temperature and humidity readings to achieve desired comfort levels, and parking lot lights may be controlled by business hours and local times of sun rise and sun set.

A facilities manager may use an EMS to calculate energy usage trends for a facility, determine the energy usage of a particular energy consuming device at the facility, and diagnose conditions associated with that device. Some conditions may be manually or automatically detected, such as a malfunctioning HVAC unit, improper temperature setting, or an oven left on when the building is unoccupied. Once identified, the manager can resolve the conditions by, for example, prioritizing retrofits and upgrades based on energy use patterns of the various devices, appliances, and equipment.

The facility manager may interact with the EMS sporadically or at regular intervals (e.g., daily, weekly, monthly, or quarterly) depending on their responsibilities and priorities. A known problem is the facilities manager cannot predict when a particular energy consuming device will stop working. For example, an HVAC unit may be cooling properly, even though the heating component has stopped working, meaning that the facility manager will not know that maintenance is needed. As a further example, if multiple HVAC units are present, then the facility manager may not know that a particular HVAC unit is not working because the other units may overcompensate, thereby shortening the lifespan of all HVAC units and consuming more energy.

One solution is to have a technician perform routine preventative maintenance inspections on the power consuming devices. These inspections may be costly for the facility owner and disruptive for the occupants. Further improvements are required.

SUMMARY

Aspects of the present disclosure relate generally to methods and systems for automated testing. Numerous aspects of the present disclosure are now described.

One aspect of the present disclosure is a method of testing an HVAC unit using an energy management system. The HVAC unit may have at least first and second stages, including either first and second heating stages or first and second cooling stages. The energy management system may include a controller for setting the HVAC unit mode and for changing set points in a thermostat controlling the HVAC unit. The controller may further receive snapshots of supply temperatures from a temperature sensor. According to these aspects, the method may comprise: setting, with the controller, the HVAC unit to a fan only mode for a first predetermined amount of time; taking, with the temperature sensor, a first snapshot before the end of the first predetermined amount of time; changing, with the controller, a set point in the thermostat to a temperature sufficient to cause the HVAC unit to enter a first stage followed by a second stage; taking, with the temperature sensor, during the first stage, a second snapshot before the end of a second predetermined time after a start of the first stage; taking, with the temperature sensor, during the second stage, a third snapshot before the end of a third predetermined time after a start of the second stage; determining, with the controller, a rate of change of the supply temperature during the first stage based on a temperature differential between the first and second snapshots and a time differential between the first and second snapshots; and determining, with the controller, a rate of change of the supply temperature during the second stage based on a temperature differential between the second and third snapshots and a time differential between the second and third snapshots.

In some aspects, the method may further comprise determining, with the controller, a rate of change of the supply temperature during the combined first and second stages based on a temperature differential between the first and third snapshots and a time differential between the first and third snapshots. The HVAC unit may have third stage that is a heating stage, further comprising: changing, with the controller, the set point in the thermostat to a temperature sufficient to cause the HVAC unit to enter the third stage after the second stage; taking, with the temperature sensor, during the third stage, a fourth snapshot before the end of a fourth predetermined time after a start of the third stage; and determining, with the controller, a rate of change of the supply temperature during the third stage based on a temperature differential between the third and fourth snapshots and the time differential between the third and fourth snapshots. The method may further comprise determining, with the controller, a rate of change of the supply temperature during the combined first, second, and third stages based on a temperature differential between the first and fourth snapshots and a time differential between the first and fourth snapshots.

In other aspects, the method may further comprise transmitting, with the controller, the rates of change to a sever remote from a facility where the HVAC unit is located; and comparing, with the server, the rates of change to one or more of: a previous rate of change for the HVAC unit, a rate of change for another HVAC unit at the same facility, or a rate of change for another HVAC unit at a different facility. In still other aspects, the HVAC unit may comprise multiple HVAC units, and the method may further comprise: grouping, with the energy management system, the first and second stages for each HVAC unit of the multiple HVAC units to define a sequence of heating and cooling tests for the multiple HVAC units; and executing, with the energy management system, the sequences of heating and cooling tests at a predetermined time. The multiple HVAC units may be located at multiple facilities. The sequence of heating and cooling tests may allow each HVAC unit to be tested at a different time of day. The method may further comprise defining, with the energy management system, a schedule that allows each HVAC unit to be tested before a seasonal change. The HVAC unit may comprise multiple HVAC units at multiple facilities, and the method may further comprise: combining, with the energy management system, the rates of change for each stage the multiple HVAC units; calculating, with the energy management system, a trend for each combined stage of the multiple HVAC units; and issuing, with the energy management system, a notification when the trend indicates that a malfunction is expected to occur.

Another aspect of the present disclosure is a method of testing an HVAC unit using an energy management system. The HVAC unit may have at least first and second stages, including either first and second heating stages or first and second cooling stages. The energy management system may include a controller for setting the HVAC unit mode and for changing set points in a thermostat controlling the HVAC unit. The controller may further receive snapshots including a supply temperature from a temperature sensor and a power measurement from a power sensor. According to these aspects, the method may comprise: setting, with the controller, the HVAC unit to a fan only mode for a first predetermined amount of time; taking, with the temperature and power sensors, a first snapshot before the end of the first predetermined amount of time; changing, with the controller, a set point in the thermostat to a temperature sufficient to cause the HVAC unit to enter a first stage followed by a second stage; taking, with the temperature and power sensor, during the first stage, a second snapshot before the end of a second predetermined time after a start of the first stage; taking, with the temperature and power sensor, during the second stage, a second snapshot before the end of a third predetermined time after a start of the second stage; determining, with the controller, a rate of change per kW of the supply temperature during the first stage based on a temperature differential between the first and second snapshots and a power differential between the first and second snapshots; and determining, with the controller, a rate of change per kW of the supply temperature during the second stage based on a temperature differential between the second and third snapshots and a power differential between the combined first and second snapshots and the third snapshot.

In some aspects, the method may further comprise determining, with the processor, a rate of change per kW of the supply temperature during the first and second stages based on a temperature differential between the first and third snapshots and a power differential between the first snapshot and the combined second and third snapshots. The HVAC unit may have a third stage that is a heating stage, and the method may further comprise: changing, with the controller, the set point in the thermostat to a temperature sufficient to cause the HVAC unit to enter the third stage after the second stage; taking, with the temperature and power sensor, during the third stage, a fourth snapshot before the end of a fourth predetermined time after a start of the third stage; and determining, with the controller, a rate of change per kW of the supply temperature during the third stage based on a temperature differential between the third snapshot and the fourth snapshot and a power differential between the combined first, second, and third snapshots and the fourth snapshot.

In other aspects, the method may comprise determining, with the controller, a rate of change of the supply temperature per kW during the combined first, second, and third stages based on a temperature differential between the first and fourth snapshots and a power differential between the first and the combined second, third, and forth snapshots. The method may further comprise transmitting, with the controller, the rates of change to a sever remote from a facility where the HVAC units are located; and comparing, with the server, the rates of change to one or more of: a previous rate of change for the HVAC unit, a rate of change for another HVAC unit at the same facility, or a rate of change for another HVAC unit at a different facility. The HVAC unit may comprise multiple HVAC units, and the method may further comprise: grouping, with the energy management system, the first and second stages for each HVAC unit of the multiple HVAC units to define a sequence of heating and cooling tests for the multiple HVAC units; and executing, with the energy management system, the sequences of heating and cooling tests at a predetermined time. The multiple HVAC units may be located at multiple facilities. The sequence of heating and cooling tests may allow each HVAC unit to be tested at a different time of day. The method may further comprise defining, with the energy management system, a schedule that allows each HVAC unit to be tested before a seasonal change. In still other aspects, the method may comprise: comparing, with the controller, a power measurement from the first snapshot to a predetermined threshold; and providing, with the controller, an indication if the power measurement is below the predetermined threshold.

BRIEF DESCRIPTION OF THE DRAWINGS

The accompanying drawings are incorporated in and constitute a part of this disclosure. These drawings illustrate aspects of the disclosure that, together with the written descriptions and appended claims, serve to explain principles of this disclosure.

FIGS. 5A and 5B show an exemplary HVAC test report.

DETAILED DESCRIPTION

Aspects of the present disclosure are now described in detail with reference to exemplary testing methods and systems. Some aspects are described with reference to the automatic testing of an HVAC unit to determine whether one or more components of the HVAC unit are operational and/or working as designed. Other aspects are described with reference to determining the efficiency of the components, and/or scheduling preventative maintenance and diagnostic functions in response to such determinations. Any reference to a particular energy consuming device (e.g., an HVAC unit); a particular component of such devices (e.g., a heating or cooling component of an HVAC unit); a particular stage of operation (e.g., a stage of heating or cooling mode); or a particular control means (e.g., an EMS) is provided for convenience and not intended to limit the present disclosure unless claimed. Accordingly, the aspects described herein may be utilize for any energy consuming device, HVAC related or otherwise.

As used in this disclosure, the terms "comprises," "comprising," or like variation, are intended to cover a non-exclusive inclusion, such that an aspect of this disclosure that comprises a list of elements does not include only those elements, but may include other elements, include those not expressly listed or inherent thereto. Unless stated otherwise, the term "exemplary" is used in the sense of "example" rather than "ideal."

Aspects of this disclosure include testing one or more energy consuming devices with an EMS. In some aspects, the EMS allows for automated testing of one or more HVAC units within one facility, or multiple HVAC units spread across facilities. Some testing methods (or "test(s)") may provide a snapshot of data (or "snapshot") regarding the operational status as well as the efficiency of the one or more HVAC units. The tests may have a scheduling component for on-demand testing as well as recurring tests. When a particular test is executed, or run, a component of the EMS (e.g., a site controller) may collect a continuous stream of data from the HVAC unit, such as a supply temperature, an outside air temperature, a zone temperature, and/or an amount of power consumed by the HVAC unit. Some tests may include predetermined testing periods that coincide with the following heating or cooling modes of an HVAC unit: Idle, Fan Only, Stage 1, Stage 2, and Stage 3. A report may be generated after each test to display the test results and provide calculations for each HVAC unit. Alternatively, an alarm may be triggered by any one of the metrics included in a report exceeding a predetermined threshold, and in the case of a combination of metrics, satisfying predetermined conditional logic.

Figure 1:
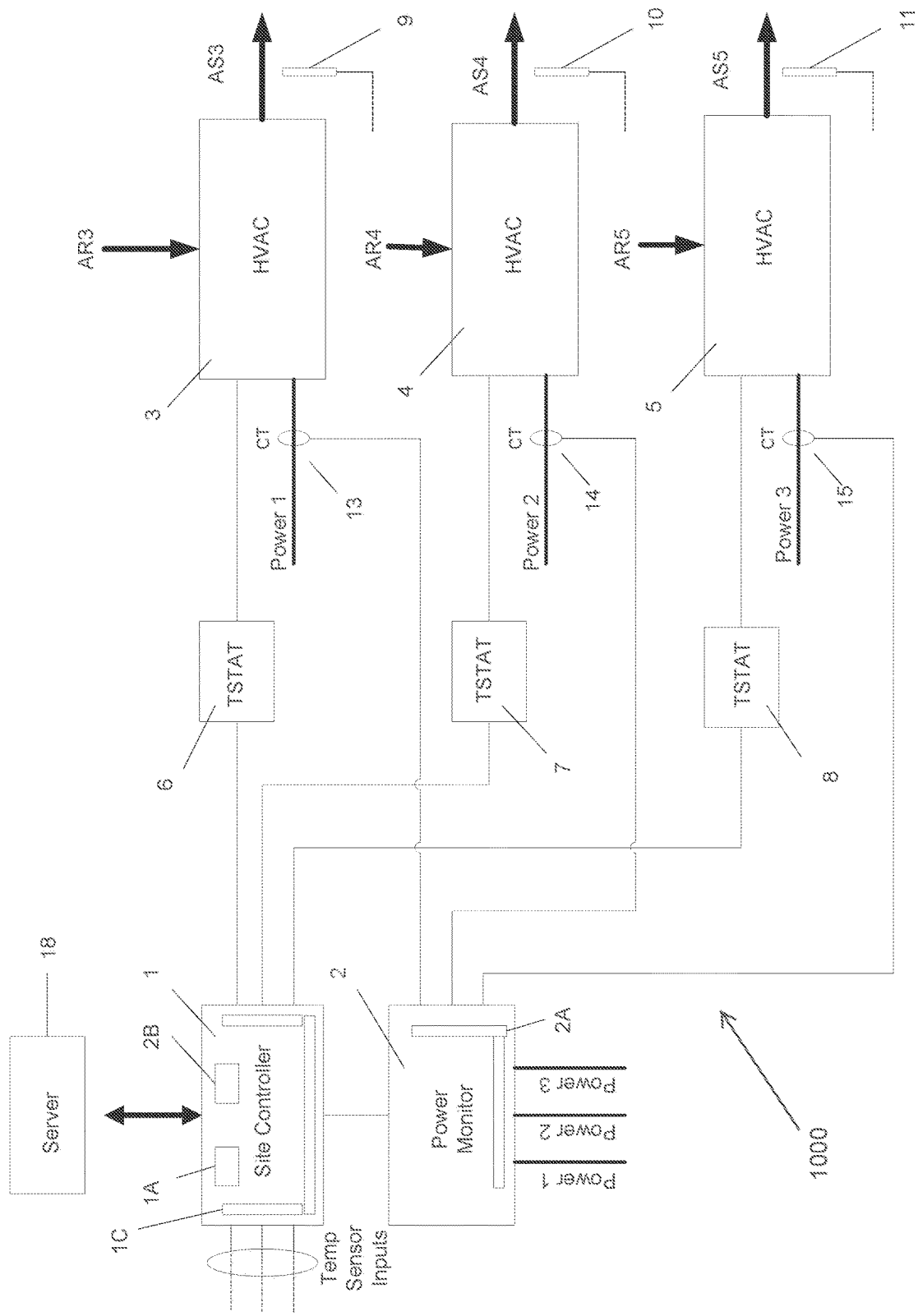
FIG. 1 shows an exemplary system according to the present disclosure, wherein multiple HVAC units are being controlled by an EMS.

FIG. 1 shows an HVAC system 1000 including multiple HVAC units (labeled individually as an HVAC unit 3, an HVAC unit 4, and an HVAC unit 5; and described together as HVAC units 3-5) being controlled by an EMS. The illustrated EMS includes, for example: a site controller 1; a power monitor 2; a thermostat (or "TSTAT") for each of HVAC units 3-5 (labeled as a TSTAT 6, a TSTAT 7, and a TSTAT 8); a temperature sensor or probe for each of HVAC units 3-5 (labeled as a sensor 9, a sensor 10, and a sensor 11); and a current transformer (or "CT") for each of HVAC units 3-5 (labeled as a CT 13, a CT 14, and a CT 15).

Each of HVAC units 3-5 has an air return (e.g., a duct; labeled as an AR3, an AR4, or an AR5), for returning air from the facility, and an air supply (e.g., a duct; labeled as an AS3, AS4, or AS5) for supplying conditioned air back into the facility. One of the temperate sensors 9-11 may be placed at an AS3-5 and configured to detect a supply temperature from one of HVAC units 3-5. Sensors 9-11 may report the supply temperature to site controller 1, either directly or via TSTATS 6-8.

Each of HVAC units 3-5 has a power supply (e.g., a supply labeled as a Power 1, a Power 2, or a Power 3). In FIG. 1, each power supply Power 1, Power 2, and Power 3 is monitored by one of CTs 13-15, each of which may be located at or near its corresponding HVAC unit 3-5, or at a main circuit panel associated with HVAC units 3-5. As shown, each of CTs 13-15 may serve as a current sensor that feeds the monitored current data back to the power monitor 2. Power monitor 2 also receives voltage from one or more of Power 1, Power 2, or Power 3 from the respective HVAC units 3-5, uses the voltage and current measurements to calculate power data for one or more of HVAC units 3-5, and relays the power data back to site controller 1. In some aspects, the power data monitored by one of the CTs 13-15 represents the total power used by the corresponding HVAC unit 3-5, including all of the power used during the various modes of operation described herein.

Site controller 1 of FIG. 1 may include, for example, one or more of: a processor 1A (or "CPU"), a memory 1B, and an I/O interface 1C. CPU 1A may control all functions of site controller 1, perform calculations on received data, and send control signals to the HVAC units 3-5, the TSTATS 6-8, or any other element of system 1000. Memory 1B may be used to store and run programs for site controller 1, store data collected from sensors 9-11, store data collected from HVAC units 3-5 (or other energy consuming devices), and/or perform any like storage functions in system 1000. The memory may be consolidated in site controller 1, or distributed through elements of system 1000. I/O interface 1C may be used to control and receive data from HVAC units 3-5 and/or sensors 9-11, and to communicate with a server 18, which may be local to remote from system 1000. Although described with reference to HVAC units 3-5, TSTATS 6-8, sensors 9-11, and the like, it should be appreciated that each CPU 1A, memory 1B, and I/O 1C may be used in a like manner to control any energy consuming device, and/or send or receive any type of data to or from such devices.

Power monitor 2 of FIG. 1 may include multiple inputs 2A for receiving current measurements from each of the CTs 13-15 coupled to one of HVAC units 3-5, and measuring supply voltages used by HVAC units 3-5 from one of Power 1, Power 2, or Power 3. Power monitor 2 may receive the current and voltage measurements, and calculate power data for HVAC units 3-5 or individual components thereof. The power measurements may, for example, be sent to site controller 1 for storage, further calculation, and transmittal to server 18.

In the configuration of FIG. 1, each of TSTATs 6-8 controls its respective HVAC unit 3-5 according to one or more parameters, such as a cooling set point, a heating set point, and an operational mode (e.g., Cooling, Heating, Fan On/Off, Idle). Each parameter may, for example, be stored within one of TSTATs 6-8 (or another component in communication therewith) along with a temperature measurement for the zone in which that TSTAT 6, 7, or 8 resides. Each TSTAT 6-8 may receive status information from one of the respective HVAC units 3-5, such as mode status (ON/OFF) and fan status (ON/OFF). The status information can be read by the site controller 1 in order to know which mode and/or stage a particular HVAC unit 3-5 is in at the time a certain data snapshot is taken. Site controller 1 may, for example, obtain a supply temperature measurement from AS3, AS4, and/or AS5 by receiving temperature data from one of the temperature probes 9, 10, or 11. Site controller 1 may also obtain temperature data directly from any of TSTATs 6-8, or another temperature sensor in communication therewith. For example, another temperature sensor may detect the air temperature outside the facility for use by controller 1. Alternatively, an outdoor temperature may be obtained by controller 1 from the server 18 via an external data source.

Accordingly, site controller 1 may determine a rate of change (or "ROC") for the supply temperature of any of AS3, AS4, or AS5 over any testing period. Site controller 1 also may determine the conditional status of the respective HVAC unit 3-5 under a particular testing period using status data read from one of the TSTATs 6-8. For example, by causing HVAC unit 3 to sequence through the various stages of a heating or cooling mode during one or more testing periods, the ROC for each mode or stage may be determined and/or benchmarked against the equivalent mode or stage of: HVAC unit 4 and/or unit 5; another HVAC unit at the facility; an HVAC unit at another site; a model-specific HVAC specification; and/or against itself, e.g., against an ROC of HVAC unit 3 from another time period. To continue this example, any of these ROC comparisons may be stored in system 1000 and used to show trends in the operation of HVAC unit 3, and/or predict the failure or malfunction of HVAC unit 3, or a component of HVAC 3 associated with a particular mode or stage, before it occurs.

Figure 2:
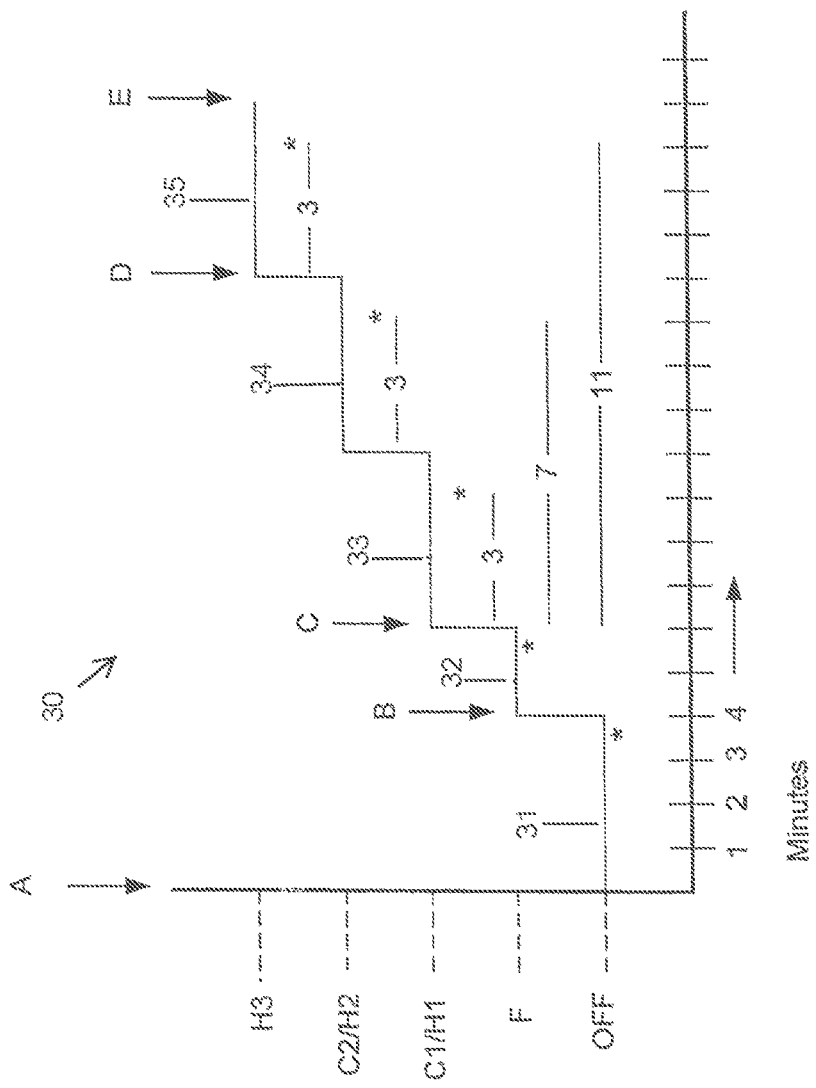
FIG. 2 shows an exemplary method according to the present disclosure, wherein an individual HVAC is being tested.

FIG. 2 shows an example of a testing method 30 (or test 30) for determining an ROC for various modes of a tested one of HVAC units 3-5 (or tested HVAC unit 3-5). In this example, each HVAC unit 3-5 may be configured for 2-stage cooling, 2-stage heating, or 3-stage heating. Test 30 of FIG. 2 has a set of testing periods 31-34 associated with 2-stage cooling/heating, and an optional testing period 35 associated with 3-stage heating.

During test 30, the mode of each HVAC unit 3-5 may be set directly by site controller 1 via one of the respective TSTATs 6-8. For example, each of TSTATs 6-8 may be responsive to the exemplary timing sequences of testing periods 31-35 described below. These timing sequences may be preset in a memory of the tested HVAC units 3-5 (or another component of system 1000). In some aspects, an HVAC units 3-5 may be set to a heating or cooling mode by setting the set points of its respective TSTAT 6-8 to extreme low or high temperature settings. For example, by setting TSTAT 6 to a high temperature set point (e.g., 85 degrees F.), HVAC unit 3 may run in a heating stage 1 for a short time (e.g., 4 minutes), a heating stage 2 for another short time (e.g., 4 minutes), and a heating stage 3 for a longer time (e.g., 8 minutes) until the zone temperature associated with TSTAT 6 and/or HVAC unit 3 reaches the high temperature set point.

Because of this predictable behavior, the three testing periods 33-35 of FIG. 2 may coincide with the respective cooling and heating stages of HVAC units 3-5. For example, if HVAC unit 3 includes a 3-stage heat pump, then the data snapshot taken near the end of each stage 1-3 will coincide with end of each testing period 33-35. In this example, each data snapshot may include, for example, the supply temperature at AS3, the power (or "kW") consumed by HVAC unit 3, and any like characteristic. In some aspects, this configuration ensures that the snapshot data (e.g., a temperature reading) obtained at the end of one testing period (e.g., period 33) is not affected by the initiation of the subsequent test period (e.g., period 34).

Exemplary test 30 may begin by taking an outdoor air temperature reading, for example, if one of HVAC units 3-5 is equipped or in communication with an outdoor air temperature sensor. As shown in FIG. 2, testing period 31 may initiate with a short (e.g., four minute) idle period starting at point A to establish a baseline. During period 31, the tested HVAC unit 3-5 may, for example, be scheduled to run with HVAC mode OFF and fan mode set to AUTO or OFF, meaning that both of the heating/cooling components and fan will be inactive. As shown in FIG. 2, at a point shortly before the end of the testing period 31 (e.g., ten seconds before the end of the idle period), a first data snapshot may be taken. In FIG. 2, this first snapshot is depicted as an asterisk (*) located just before the end of testing period 31. The first snapshot may include at least one of: a zone temperature, a supply air temperature at one of AS 3-5, and a time stamp associated therewith. In some aspects, a third component of the snapshot may be a power measurement (e.g., kW) derived from the current and line voltage measurements of the tested HVAC unit 3-5. Taking the snapshot shortly before the end of testing period 31 may ensure that first snapshot is not affected by the startup of the fan in testing period 32.

Testing period 32 may be a short (e.g., a two minute) fan ON period starting at point B of FIG. 2. During this time, the tested HVAC unit 3-5 may, for example, be scheduled to run with HVAC mode OFF and fan mode ON, meaning that the fan is active and the heating/cooling components of the tested HVAC unit 3-5 are inactive. This configuration ensures that the air moving through the tested HVAC unit 3-5, including the air moving through the respective AS 3-5, is at the zone temperature, and that any residual air from the heating/cooling components of the tested HVAC unit 3-5 does not affect another stage of test 30. Shortly (e.g., ten seconds) before the end of testing period 32, i.e., before the end of the fan ON period, a second data snapshot may be taken. In FIG. 2, this second data snapshot is depicted as another asterisk (*) located just before the end of testing period 32. This second data snapshot may indicate a starting temperature for a cooling or heating mode of one or more of HVAC units 3-5, and if available, the power draw contributed by the fan.

Testing periods 33 and 34 of test 30 is where one of HVAC units 3-5 is tested during one or more stages of its heating or cooling mode. In both instances, heating or cooling, the tested one of HVAC units 3-5 is operated in HVAC mode AUTO and fan mode AUTO, meaning that both of the heating/cooling components and fan are active and responsive to the cooling or heating set points of the respective TSTAT 6-8. For a cooling test, the cooling set point may be set to 65 degrees F.; and for a heating test, the heating set point may be set to 85 degrees F. These temperatures are exemplary in that another other set points and/or temperature range may be used. In some aspects, these temperature settings may ensure that HVAC units 3-5 will sequence through the aforementioned two or three cooling and heating stages according to a known timing sequence with predictable run times.

In some aspects, testing period 33 may be run for a short time (e.g., a total of four minutes) during the first stage, and testing period 34 may be run for at least for same amount of time (i.e., at least a total of 4 minutes) during the second stage. Testing periods 33 and 34 may, for example, cover seven minutes total, with a third snapshot being taken after the first three minutes of testing period 33, and a fourth data snapshot being taken at the end of the first three minutes of testing period 34. As before, these third and fourth snapshots are depicted in FIG. 2 as asterisks (*) located just before the end of testing periods 33 and 34. The run times described above with reference to testing periods 31-34 are exemplary and may vary according to the energy consuming device being tested. If both heating and cooling tests are desired, then site controller 1 may repeat each testing period 33 and 34. For example, controller 1 may cycle through each of HVAC units 3-5 first for the cool test, and second for the heat test.

If the tested HVAC unit 3-5 does not include a heat pump, then test 30 may be completed at point D of FIG. 2. Alternatively, if the tested HVAC unit 3-5 includes a 3-stage heat pump, then test 30 may include an additional testing period 35, wherein the heat pump is activated during a third heating stage. Fifth testing period 35 may be initiated at point D of FIG. 2. Similar to above, a fifth data snapshot may be taken shortly (e.g., three minutes) into testing period 35, as indicated by the asterisk (*) located just before end of testing period 35 on FIG. 2. Thus, according to this aspect, the third, fourth, and fifth data snapshots may be taken over a defined time period (e.g., an eleven minute period) including any portion of testing periods 33-35. In FIG. 2, for example, the third, fourth, and fifth data snapshots are taken, respectively, at the three, seven, and eleven minute marks after testing period 33 is initiated (i.e., at point C).

Figure 3:
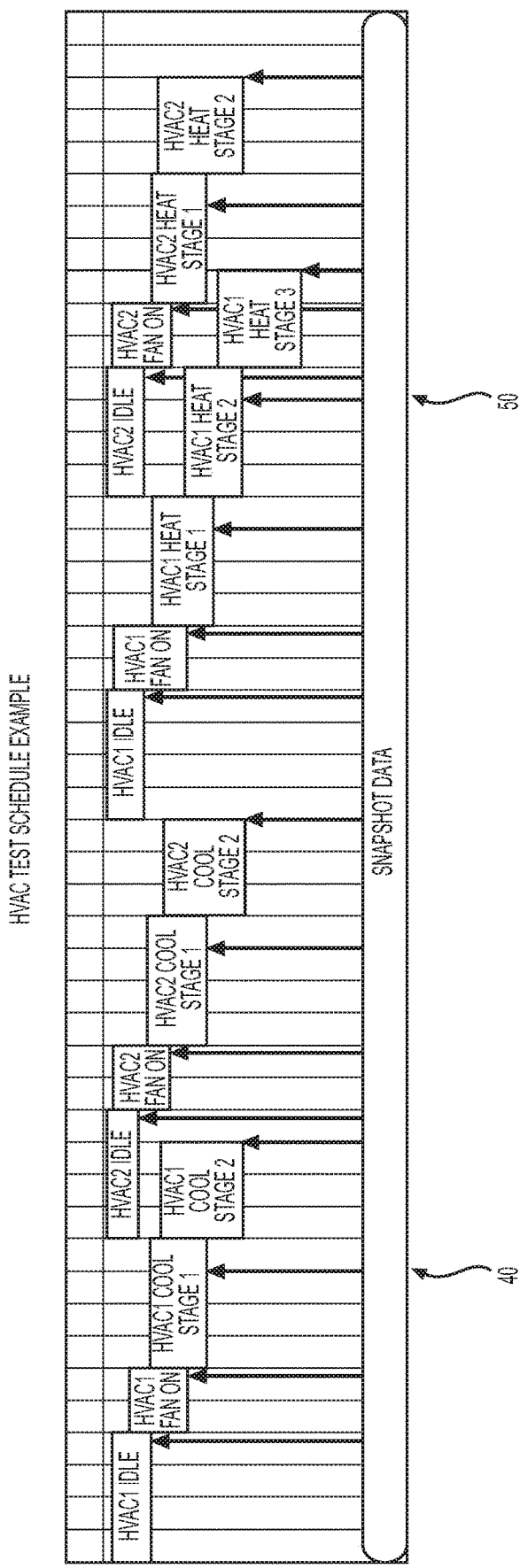
FIG. 3 shows another exemplary method according to the present disclosure, wherein multiple HVAC units are being tested.

In many facilities, as in FIG. 1, there exist multiple HVAC units that heat and cool the air. Test 30 may be performed on each of these multiple HVAC units. In order to prevent one HVAC unit (e.g., HVAC unit 3) from influencing the test of another HVAC unit (e.g., HVAC unit 5), the respective tests 30 may be scheduled to occur at different times of day. Associated outdoor temperatures may also be used to normalize ROC measurements for varying indoor/outdoor temperature gradients thereby providing a greater sensitivity to comparisons, e.g., self-to-self trending. FIG. 3 shows an example schedule for using test 30 with two HVAC units, labeled respectively as an HVAC1 and an HVAC 2, wherein HVAC1 is a heat pump. Each vertical line in the graph represents an increment of time (e.g., one minute), and each arrow represents a data snapshot. In the schedule shown in FIG. 3, the cooling modes of HVAC1 and HVAC2 are tested in a first sequence 40, and the heating modes of HVAC1 and HVAC2 are tested in a second sequence 50.

If HVAC1 or HVAC2 are sub-metered, then power may be measured in each snapshot so that a disaggregation can be performed to determine the power used for each testing period of test 30. By measuring the supply temperature as well as the power consumed, test 30 may yield an ROC per kW for HVAC1 and HVAC2. In addition to informing the facilities manager, the respective ROCs over time can indicate how much energy was expended to achieve the ROC during each testing period. For example, the power used by each testing period can be calculated by first measuring the power usage for HVAC1 and HVAC2 when each unit is idle (e.g., in testing period 31 described above). The additional power measured when the fan is engaged is the power consumed by the fan (e.g., in testing period 32 described above). The additional power measured in each successive testing period is, thus, the power consumed by each stage of heating or cooling (e.g., in testing periods 33-35 described above). In this way, the power consumption of each component of HVAC1 and/or HVAC2 may be isolated using only a single power measurement at the power supply of HVAC1 and/or HVAC 2.

Test 30 may also be performed on an HVAC unit that is just being controlled thermostatically for duct temperature, and will be expressed as a ROC per time. The performance can be calculated for either scenario using the exemplary calculations shown below:

Without Submetering:

$$ROC_{stage1} = \frac{SAT_{stage1} - SAT_{fan}}{3 \text{ min}}$$

$$ROC_{stage2} = \frac{SAT_{stage2} - SAT_{stage1}}{3 \text{ min}}$$

$$ROC_{stage3} = \frac{SAT_{stage3} - SAT_{stage2}}{3 \text{ min}}$$

$$ROC_{2\text{-stage overall}} = \frac{SAT_{stage2} - SAT_{fan}}{7 \text{ min}}$$

$$ROC_{3\text{-stage overall}} = \frac{SAT_{stage3} - SAT_{fan}}{11 \text{ min}}$$

where $SAT_{fan}$ is the Supply Air Temperature measured at the end of the Fan Only stage.

$SAT_{stage1}$ is the Supply Air Temperature at the end of Stage 1.

$SAT_{stage1}$ is the Supply Air Temperature at the end of Stage 2.

$SAT_{stage2}$ is the Supply Air Temperature at the end of Stage 3.

And each stage lasts 4 minutes long.

With Submetering:

$$ROC_{stage1} = \frac{SAT_{stage1} - SAT_{fan}}{kW_{stage1} - kW_{fan}}$$

$$ROC_{stage2} = \frac{SAT_{stage2} - SAT_{stage1}}{kW_{stage2} - kW_{stage1}}$$

$$ROC_{stage3} = \frac{SAT_{stage3} - SAT_{stage2}}{kW_{stage3} - kW_{stage2}}$$

$$ROC_{2\text{-stage overall}} = \frac{(SAT_{stage2} - SAT_{fan}) \times 7 \text{ min}}{(kW_{stage1} \times 4 \text{ min}) + (kW_{stage2} \times 3 \text{ min}) - (kW_{fan} \times 7 \text{ min})}$$

$$ROC_{3\text{-stage overall}} = \frac{(SAT_{stage3} - SAT_{fan}) \times 11 \text{ min}}{(kW_{stage1} \times 4 \text{ min}) + (kW_{stage2} \times 4 \text{ min}) + (kW_{stage3} \times 3 \text{ min}) - (kW_{fan} \times 11 \text{ min})}$$

where $kW_{fan}$ is the Power (kW) measured at the end of the Fan Only stage.

$kW_{stage1}$ is the Power (kW) measured at the end of Stage 1.

$kW_{stage2}$ is the Power (kW) measured at the end of Stage 2.

$kW_{stage3}$ is the Power (kW) measured at the end of Stage 3.

HVAC1 and HVAC2 of FIG. 3 may be configured to operate in each testing period of test 30 for a predetermined amount of time (e.g., four minutes) before entering into the next testing period. Using this timing, the data snapshots may be taken after the start of each testing period of test 30 (e.g., three minutes after the start of a four minute stage of operation for HVAC1 or HVAC2), leaving a defined period of time after the snapshot (e.g., one minute) before entering into the next testing period. In some aspects, more precise measurements of ROC for each testing period of each test 30 may be taken by delaying the snapshot until closer to the end of each testing period, or by taking additional measurements at the start of each testing period and using the difference in the beginning and end times to calculate the ROC. An example is provided below for metered and non-metered aspects of HVAC1 and HVAC2.

Without Submetering:

$$ROC_{stage1} = \frac{SAT_{stage1} - SAT_{stage1begin}}{Time_{stage1end-stage1begin}}$$

$$ROC_{stage2} = \frac{SAT_{stage2end} - SAT_{stage2begin}}{Time_{stage2end-stage2begin}}$$

$$ROC_{2\text{-stage overall}} = \frac{SAT_{stage2end} - SAT_{stage1begin}}{Time_{stage2end-stage1begin}}$$

$$ROC_{3\text{-stage overall}} = \frac{SAT_{stage3end} - SAT_{stage1begin}}{Time_{stage3end-stage1begin}}$$

-continued where $SAT_{stage1end}$ is the Supply Air Temperature measured at the end of stage 1.

$SAT_{stage1begin}$ is the Supply Air Temperature measured at the beginning of Stage 1.

$SAT_{stage2end}$ is the Supply Air Temperature measured at the end of Stage 2.

$SAT_{stage2begin}$ is the Supply Air Temperature measured at the beginning of Stage 2.

$SAT_{stage3end}$ is the Supply Air Temperature measured at the end of Stage 3.

$SAT_{stage3begin}$ is the Supply Air Temperature measured at the beginning of Stage 3.

With Submetering:

$$ROC_{stage1} = \frac{SAT_{stage1end} - SAT_{stage1begin}}{kW_{stage1begin} - kW_{fan}}$$

$$ROC_{stage2} = \frac{SAT_{stage2end} - SAT_{stage2begin}}{kW_{stage2begin} - kW_{stage1end}}$$

$$ROC_{stage3} = \frac{SAT_{stage3end} - SAT_{stage3begin}}{kW_{stage3begin} - kW_{stage2end}}$$

$$ROC_{\text{2-stage overall}} = \frac{(SAT_{stage2end} - SAT_{stage1begin}) \times T_{stage2end-stage1begin}}{((kW_{stage1begin} - kW_{fan}) \times T_{stage1end-stage1begin}) + \\ ((kW_{stage2begin} - kW_{stage1end}) \times T_{stage2end-stage1begin}) - \\ ((kW_{fan} \times T_{stage2end-stage1begin}))}$$

Still other ways of calculating an ROC for the supply temperatures of HVAC1 and HVAC 2 may be performed. For example, power may be measured in the middle of a particular testing period of test 30, or during shorter time periods within each testing period of test 30. If separate metering is available for each component of HVAC1 and HVAC2, then disaggregating power measurements may not be necessary as direct power measurements may be obtained directly from the individual components. Moreover, temperature measurements from sources other than exemplary temperature sensors 9-11 of FIG. 1 may be used, such as a zone temperature read directly from one of TSTATs 6-8, or a zone temperature from an external zone sensor, any of which may be used to calculate the temperature differentials described herein.

Snapshot timing could also be performed without reference to the expected timing modes of HVAC1 and HVAC2. For example, snapshot data may be reported from one of TSTATs 6-8 with or without knowledge of the predicted timing of each stage of operation for a particular heating or cooling mode of an HVAC1 or HVAC2 described herein. Alternatively, the snapshot data (or additional data) may be obtained when the stage of HVAC1 and HVAC2 changes to ensure that data is obtained at the correct time, and to verify the proper timing sequence of each testing period of test 30. Of course, for aspects of HVAC1 or HVAC2 having different timing sequences, constants for those timings may be substituted in the equations above. For example, if HVAC1 unit did not enter stage 2, for example, ten minutes after stage 1 started, then the constants used in the equations provided above would need to be adjusted accordingly to determine when to take the snapshots and how to calculate the ROC for each testing period of test 30.

In some aspects, after test 30 is completed for each of HVAC1 and HVAC2 (or each of HVAC units 3-5), then a key metric list may be generated with the following details for each of HVAC1 and HVAC2:
 a. HVAC ID
 b. Load (kW), zone temp (deg F.), and supply air temp (deg F.) for each of the following HVAC modes:
  i. Idle
  ii. Fan Only
  iii. Stage 1
  iv. Stage 2
  v. Stage 3
  vi. HVAC Type
 c. Outdoor temp (F.°/C.°)
 d. Operational test results (pass or fail—reason)
 e. Display all reasons for failure in the results column
 f. ROC for each testing period and for the entire test Test 30 may capture data points before the test script is run as well as during any of testing periods 31-35 described herein.

In some aspects, the power data captured at each data snapshot can be used to detect component failures and/or malfunctions. For example, if an HVAC unit enters a FAN only mode, but the current does not increase by a predetermined threshold, or if the HVAC unit enters an idle mode and the current is above a predetermined threshold, this would indicate the fan motor is malfunctioning or the HVAC is wired (jumpered) incorrectly. Similarly, when entering a heating or cooling stage, if the current exceeds a maximum predetermined threshold or falls below a minimum predetermined threshold, it can be determined that the compressor is malfunctioning and/or has been wired incorrectly. Such thresholds can be set manually or can be pulled automatically from a database of specifications for the model of HVAC unit under test. For newly commissioned HVAC units, installation errors can be quickly and automatically detected. For older HVAC units, a malfunctioning part can be detected before or after the part completely fails.

Figure 4:
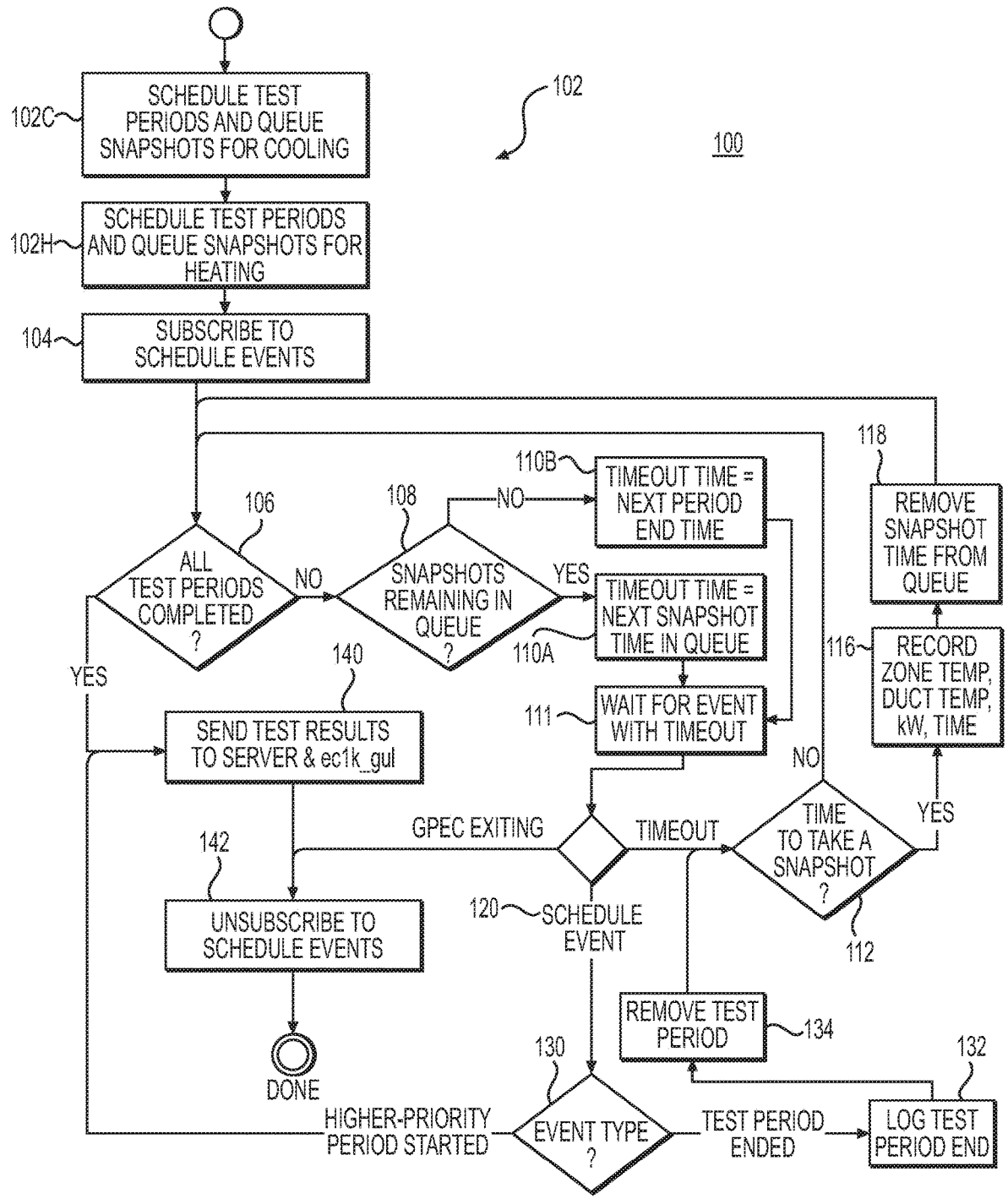
FIG. 4 shows a flow chart of another exemplary method, wherein an HVAC test script is running on an EMS controller.

In some exemplary aspects, controller 1 may utilize software (e.g., a GridPoint Energy Controller or "GPEC") to execute test 30 and perform other functions associated therewith. GPEC may, for example, communicate with server 18 to control test 30, access the snapshot data, and update schedules 40 and 50. An exemplary logic sequence 100 used by GPEC to implement test 30 is shown in FIG. 4.

As shown, sequence 100 may begin with a step 102 of scheduling all test periods and calculating all snapshot times. In FIG. 4, step 102 is further divided into a scheduling step for cooling (102C) and a scheduling step for heating (102H). Each of the snapshot times are stored in a queue. If multiple HVAC units are to be tested, as in FIG. 2, then the snapshot times may be coordinated so that each test in performed on each HVAC unit at a different time (e.g., a different time of day). Another step of sequence 100 is a step 104 for subscribing to (or defining) a schedule comprising scheduling events that allow each HVAC until to be tested at a particular time (e.g., a particular time of year). For example, the schedule may allow a cooling test to be run on each HVAC unit before a seasonal change from winter to summer, thereby helping the facility to know which HVAC units will need maintenance before summer arrives.

Another step in sequence 100 includes a step 106 of executing the testing periods subscribed in step 104. If all test periods have been completed (as determined in step 106), then a step 108 determines whether another snapshot remains in the queue. If so, then sequence 100 further includes a step 110A of determining a predetermined time (labeled as a "Timeout Time" in FIG. 4) after the start of a scheduled testing period or stage, a step 111 of waiting for the predetermined time to elapse, a step 112 of determining whether the predetermined time has elapsed, and a step 116 of recording a snapshot after the predetermined time, the snapshot including, for example, the zone temperature, duct temperature, and/or power in kW.

The GPEC may generate a list of each of the testing periods and snapshots scheduled in step 102. For example, once the recording step 116 has been completed for a particular snapshot, then a step 118 removes that snapshot from the list, before returning sequence 100 to the start of step 106 to determine whether all of the test periods are complete. As a further example, if step 108 indicates that no snapshots remain in the queue for a particular testing period, then a step 110B may be used to define a predetermined time (also labeled as a "Timeout Time" in FIG. 4) equal to the end time for the testing period. Step 111, as before, comprises waiting for the predetermined time to elapse, thereby defining the end of the testing period, after which a signal 120 (labeled as "Schedule Event" in FIG. 4) is generated by the GPEC to indicate that the testing period has ended. Signal 120 may, as in FIG. 4, cause a step 130 for determining the type of testing period (e.g., heating or cooling), a step 132 for logging the completion of a testing period, and a step 134 for removing the testing period from the list before returning sequence 100 to the start of step 106. In some aspects, the GPEC may not schedule test periods or snapshots for HVAC logical devices which use non-GridPoint thermostat devices. The test result for these devices may be immediately set to an error message, such as DEVICE_NOT_SUPPORTED, and the devices will then be skipped for purposes of scheduling.

Once all of test periods are complete (as determined in step 106), then sequence 100 may further include a step 140 for sending the test results to, for example, server 18 and/or site controller 1; and step 142 for unsubscribing to the schedule subscribed to in step 104. In some aspects, sequence 100 may also be utilized to prioritize a particular cooling or heating test. Step 130 of FIG. 4, for example, includes determining whether a testing period is a higher-priority testing period. If a higher-priority testing period begins running while a lower-priority testing period is running, then step 130 may be used to end the lower-priority testing period. Step 140 may, thus, be used to send whatever results have been collected to, for example, server 18 and/or site controller 1. This effect is similar to what happens when the test is manually cancelled.

In some aspects, site controller 1 may communicate with server 18 to send all of the measured data and/or calculated values to server 18, which may then perform additional calculations and/or create a report from the data. For example, the report may be viewable from a cloud-based energy management software platform, or from controller 1 after the test 30 has completed.

Figure 5B:

An exemplary report 200 is illustrated in FIGS. 5A and 5B. As shown, report 200 may be generated for each HVAC unit (e.g., HVAC1 or HVAC2), after each run of test 30, and configured to display data from the key metrics list. Report 200 may show the rate of change for temperature and energy consumption as the HVAC units are being tested. In some aspects, historical versions of report 200 may be generated to display the same information (e.g., the key metrics) in a way that allows a facility manager to compare one run of test 30 against another to see efficiency trends. These trends may, alternatively, be calculated automatically and compared to dynamic thresholds to determine, for example, if the heating/cooling components of an HVAC unit need maintenance or are about to fail or malfunction. For example, a dynamic threshold may be retrieved from a database of known characteristics of a given model of HVAC unit, at a particular lifespan, and adjusted over time based on experience with similar HVAC units resulting from data collected by the EMS.

In some aspects, the facility manager may schedule test 30 on-demand, for a future date and time, and/or have it set to a monthly or quarterly interval for selected HVAC units. This scheduling can be done either remotely through the cloud-based energy management platform, or at the site through site controller 1. If one HVAC unit is already scheduled for a run of test 30, then the facility manager may be able to see the current scheduled run of test 30 and override it with a new run of test 30, if desired.

Any run of test 30, present or future, may be cancelled. For example, a present or future run of test 30 may be canceled from site controller 1, from the cloud-based energy management platform, from a command issued by server 18, or the like. Cancelling a run of test 30 may cause a cancelled report to be sent to the facility manager.

A plurality of runs of test 30 may be scheduled for one or more HVAC units at a facility, as shown in FIG. 3, wherein two runs of test 30 are schedule to run concurrently. In some aspects, a user may schedule an automated HVAC test for multiple HVAC units across multiple sites from a single cloud-based software portal. Scheduling an automated HVAC test for more than one HVAC unit or more than one site may be done through a single effort. A user may cancel an automated HVAC test for multiple HVAC units across multiple sites with one effort as well.

In sum, aspects of exemplary methods and systems for automated testing are described in this disclosure, many of which provide for automated testing of HVAC units using an EMS. The disclosed systems may be used to perform the various testing methods described herein, and report on the operational status and efficiency of the tested devices across any number of facilities, locations, or sites. The described systems may, for example, be configured to remotely schedule on-demand and recurring runs of test 30, automatically report the test results, permit remote viewing of the schedule associated with one or more runs of test 30, determine and report the current status of any run of test 30, and remotely cancel a run of test 30 (e.g., in real-time). A computer program product can assist with the commissioning of an energy management system by automatically testing the connectivity and operational status of the HVAC units on site. The hardware program product may automatically test all stages of an HVAC unit to give better insight into issues when an HVAC unit is not operational. The hardware program product also may automatically be scheduled to test an HVAC unit for operational acceptance before seasonal changes.

The present disclosure may be understood more readily by reference to the various descriptions and examples provided herein. As provided above, aspects of the invention provide systems and methods for the modeling of energy use patterns and for the creation and conveyance of near real-time feedback in a systematic and controlled manner for in-the-moment energy consumption management of appliances, devices, and equipment used in high-touch and on-demand services and operations.

Hardwired circuitry may be used in combination with software instructions to implement any of the methods described herein; provided, however, that the described methods are neither limited to any specific combination of hardware circuitry and software, nor to any particular source for the instructions executed by the data processing system, nor to any specific location for data processing.

Although aspects of the present disclosure have been described in considerable detail with reference to certain exemplary configurations, still other configurations are possible. Therefore, the spirit and scope of the appended claims should not be limited to the description of any aspect described herein. The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features. For example, those having ordinary skill in the art and access to the teachings provided herein will recognize additional modifications, applications, aspects, and substitution of equivalents all fall in the scope of the aspects disclosed herein.

Any element in a claim that does not explicitly state "means for" performing a specified function, or "step for" performing a specific function, is not to be interpreted as a "means" or "step" clause as specified in 35 U.S.C § 112. In particular, the use of "step of" in the claims herein is not intended to invoke the provisions of 35 U.S.C § 112.

The invention claimed is:

1. A method of testing an HVAC unit using an energy management system, the HVAC unit having a plurality of components, the HVAC unit being configured to operate in at least a first stage, the energy management system including a controller for setting the HVAC unit mode and for changing set points in a thermostat controlling the HVAC unit, the controller further receiving snapshots of supply temperatures from a temperature sensor, the method comprising:
    setting, with the controller, the HVAC unit to a first mode of operation for a first predetermined amount of time;
    taking, with the temperature sensor, a first snapshot at a first snapshot time before or after the end of the first predetermined amount of time;
    changing, with the controller, a set point in the thermostat to a temperature sufficient to cause the HVAC unit to operate in a second mode of operation;
    taking, with the temperature sensor, a second snapshot at a second snapshot time before or after the end of a second predetermined time after a start of the second mode of operation; and
    determining, with the controller, a rate of change of the supply temperature during the second mode of operation based on a temperature differential between the first and second snapshots and a time differential between the first and second snapshots.

2. The method of claim 1, wherein the first mode of operation is a fan only mode of operation, and wherein the second mode of operation is a first stage in which at least a first component among the plurality of components is operating.

3. The method of claim 1, wherein the set point is sufficient to cause the HVAC unit to operate in a third mode of operation,
    the method further comprising:
    taking, with the temperature sensor, a third snapshot at a third snapshot time before or after the end of a third predetermined time after a start of the third mode of operation;
    determining, with the controller, a rate of change of the supply temperature during the third mode of operation based on a temperature differential between the second and third snapshots and a time differential between the second and third snapshots; and
    determining, with the controller, a rate of change of the supply temperature during the second mode of operation and the third mode of operation based on a temperature differential between the first and third snapshots and a time differential between the first and third snapshots.

4. The method of claim 3, wherein the third mode of operation is a second stage in which at least a second component among the plurality of components is operating.

5. The method of claim 3, wherein the HVAC unit is further configured to operate in a heating mode of operation, further comprising:
    changing, with the controller, the set point in the thermostat to a temperature sufficient to cause the HVAC unit to operate in the heating mode of operation;
    taking, with the temperature sensor, during the heating mode of operation, a fourth snapshot at a fourth snapshot time before or after the end of a fourth predetermined time after a start of operation of the heating mode of operation; and
    determining, with the controller, a rate of change of the supply temperature during operation of the heating mode of operation based on a temperature differential between the third and fourth snapshots and a time differential between the third and fourth snapshots.

6. The method of claim 5, further comprising:
    determining, with the controller, a rate of change of the supply temperature during operation of the second mode of operation, third mode of operation, and heating mode of operation based on a temperature differential between the first and fourth snapshots and a time differential between the first and fourth snapshots.

7. The method of claim 1, further comprising:
    transmitting, with the controller, the rates of change to a sever remote from a facility where the HVAC unit is located; and
    comparing, with the server, the rates of change to one or more of:
        a previous rate of change for the HVAC unit,
        a rate of change for another HVAC unit at the same facility, and
        a rate of change for another HVAC unit at a different facility.

8. The method of claim 1, wherein the HVAC unit comprises multiple HVAC units, the method further comprising:
    grouping, with the energy management system, the second, third, and heating modes of operation for each HVAC unit of the multiple HVAC units to define a sequence of heating and cooling tests for the multiple HVAC units; and executing, with the energy management system, the sequences of heating and cooling tests at a predetermined time.

9. The method of claim 1, further comprising:
predicting a failure or a malfunction of the first component based on the determined rate of change of the supply temperature during the second mode of operation.

10. The method of claim 1, wherein the HVAC unit comprises multiple HVAC units at multiple facilities, the method further comprising:
combining, with the energy management system, the rates of change for each mode of operation of the multiple HVAC units;
calculating, with the energy management system, a trend for each combined mode of operation of the multiple HVAC units; and
issuing, with the energy management system, a notification when the trend indicates that a malfunction is expected to occur.

11. A method of testing an HVAC unit using an energy management system, the HVAC unit having a plurality of components, the HVAC unit being configured to operate in at least a first stage, the energy management system including a controller for setting the HVAC unit mode and for changing set points in a thermostat controlling the HVAC unit, the controller further receiving snapshots that include a supply temperature from a temperature sensor and a power measurement from a power sensor, the method comprising:
setting, with the controller, the HVAC unit to a first mode of operation for a first predetermined amount of time;
taking, with the temperature and power sensors, a first snapshot at a first snapshot time before or after the end of the first predetermined amount of time;
changing, with the controller, a set point in the thermostat to a temperature sufficient to cause the HVAC unit to operate in a second mode of operation;
taking, with the temperature and power sensors, a second snapshot at a second snapshot time before or after the end of a second predetermined time after a start of the second mode of operation; and
determining, with the controller, a rate of change per kW of the supply temperature during the second mode of operation based on a temperature differential between the first and second snapshots and a power differential between the first and second snapshots.

12. The method of claim 11, wherein the first mode of operation is a fan only mode of operation, and wherein the second mode of operation is a first stage in which at least a first component among the plurality of components is operating.

13. The method of claim 11, wherein the set point is sufficient to cause the HVAC unit to operate in a third mode of operation,
the method further comprising:
taking, with the temperature sensor, a third snapshot at a third snapshot time before or after the end of a third predetermined time after a start of the third mode of operation;
determining, with the controller, a rate of change of the supply temperature during the third mode of operation based on a temperature differential between the second and third snapshots and a time differential between the second and third snapshots; and
determining, with the processor, a rate of change per kW of the supply temperature during the second mode of operation and the third mode of operation based on a temperature differential between the first and third snapshots and a power differential between the first snapshot and the combined second and third snapshots.

14. The method of claim 13, wherein the third mode of operation is a second stage in which at least a second component among the plurality of components is operating.

15. The method of claim 13, wherein the HVAC unit is further configured to operate in a heating mode of operation, the method further comprising:
changing, with the controller, the set point in the thermostat to a temperature sufficient to cause the HVAC unit to operate in the heating mode of operation;
taking, with the temperature and power sensors, during the heating mode of operation, a fourth snapshot at a fourth snapshot time before or after the end of a fourth predetermined time after a start of operation of the heating mode of operation; and
determining, with the controller, a rate of change per kW of the supply temperature during operation of the heating mode of operation based on a temperature differential between the third snapshot and the fourth snapshot and a power differential between the combined first, second, and third snapshots and the fourth snapshot.

16. The method of claim 15, further comprising:
determining, with the controller, a rate of change of the supply temperature per kW during operation of the second mode of operation, third mode of operation, and heating mode of operation based on a temperature differential between the first and fourth snapshots and a power differential between the first and the combined second, third, and forth snapshots.

17. The method of claim 11, further comprising:
transmitting, with the controller, the rates of change to a sever remote from a facility where the HVAC units are located; and
comparing, with the server, the rates of change to one or more of:
a previous rate of change for the HVAC unit,
a rate of change for another HVAC unit at the same facility, and
a rate of change for another HVAC unit at a different facility.

18. The method of claim 11, wherein the HVAC unit comprises multiple HVAC units, the method further comprising:
grouping, with the energy management system, the second, third, and heating modes of operation for each HVAC unit of the multiple HVAC units to define a sequence of heating and cooling tests for the multiple HVAC units; and
executing, with the energy management system, the sequences of heating and cooling tests at a predetermined time.

19. The method of claim 11, further comprising:
predicting a failure or a malfunction of the first component based on the determined rate of change of the supply temperature during the second mode of operation.

20. The method of claim 11, further comprising:
comparing, with the controller, a power measurement from the first snapshot to a predetermined threshold; and
providing, with the controller, an indication if the power measurement is below the predetermined threshold.

* * * * *